US009992387B2

(12) United States Patent
Jin et al.

(10) Patent No.: US 9,992,387 B2
(45) Date of Patent: *Jun. 5, 2018

(54) VIDEO DENOISING USING OPTICAL FLOW

(71) Applicant: Adobe Systems Incorporated, San Jose, CA (US)

(72) Inventors: Hailin Jin, San Jose, CA (US); Zhuoyuan Chen, Evanston, IL (US); Scott D. Cohen, Sunnyvale, CA (US); Jianchao Yang, San Jose, CA (US); Zhe Lin, Fremont, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 302 days.

This patent is subject to a terminal disclaimer.

(21) Appl. No.: 15/063,240

(22) Filed: Mar. 7, 2016

(65) Prior Publication Data
US 2016/0191753 A1    Jun. 30, 2016

Related U.S. Application Data

(63) Continuation of application No. 14/205,027, filed on Mar. 11, 2014, now Pat. No. 9,311,690.

(51) Int. Cl.
*G06K 9/00* (2006.01)
*H04N 5/21* (2006.01)
(Continued)

(52) U.S. Cl.
CPC ............. *H04N 5/21* (2013.01); *G06T 3/4053* (2013.01); *G06T 3/4076* (2013.01); *G06T 5/002* (2013.01);
(Continued)

(58) Field of Classification Search
CPC .......... H04N 5/21; H04N 5/147; H04N 5/145; H04N 5/144; G06T 2207/20201;
(Continued)

(56) References Cited

U.S. PATENT DOCUMENTS 8,619,881 B2 * 12/2013 Schoenblum .......... H04N 19/61
                                                   375/240.18
8,908,766 B2   12/2014 Pace
(Continued)

OTHER PUBLICATIONS

Liu,"A High-Quality Video Denoising Algorithm based on Reliable Motion Estimation", European Conference on Computer Vision, 2010., Sep. 5, 2010, pp. 706-719.
(Continued)

*Primary Examiner* — Aaron W Carter
(74) *Attorney, Agent, or Firm* — Wolfe-SBMC (57) ABSTRACT

In techniques for video denoising using optical flow, image frames of video content include noise that corrupts the video content. A reference frame is selected, and matching patches to an image patch in the reference frame are determined from within the reference frame. A noise estimate is computed for previous and subsequent image frames relative to the reference frame. The noise estimate for an image frame is computed based on optical flow, and is usable to determine a contribution of similar motion patches to denoise the image patch in the reference frame. The similar motion patches from the previous and subsequent image frames that correspond to the image patch in the reference frame are determined based on the optical flow computations. The image patch is denoised based on an average of the matching patches from reference frame and the similar motion patches determined from the previous and subsequent image frames.

20 Claims, 6 Drawing Sheets

(51) Int. Cl.
*G06T 3/40* (2006.01)
*G06T 5/00* (2006.01)
*G06T 5/50* (2006.01)
*G06T 5/20* (2006.01)
*H04N 5/14* (2006.01)
*G06T 7/269* (2017.01)

(52) U.S. Cl.
CPC ............... *G06T 5/003* (2013.01); *G06T 5/20* (2013.01); *G06T 5/50* (2013.01); *G06T 7/269* (2017.01); *H04N 5/144* (2013.01); *H04N 5/145* (2013.01); *H04N 5/147* (2013.01); *G06T 2207/10016* (2013.01); *G06T 2207/20021* (2013.01); *G06T 2207/20032* (2013.01); *G06T 2207/20182* (2013.01); *G06T 2207/20201* (2013.01)

(58) Field of Classification Search
CPC . G06T 2207/20182; G06T 2207/20032; G06T 2207/20021; G06T 2207/10016; G06T 7/269; G06T 5/50; G06T 5/20; G06T 5/003; G06T 5/002; G06T 3/4076; G06T 3/4053
See application file for complete search history.

(56) References Cited

U.S. PATENT DOCUMENTS

| | | | | |
|---|---|---|---|---|
| 8,917,948 | B2* | 12/2014 | Jin | G06T 3/4053 |
| | | | | 382/254 |
| 8,928,813 | B2 | 1/2015 | Liu | |
| 9,087,390 | B2* | 7/2015 | Jin | G06T 3/4053 |
| 9,311,690 | B2* | 4/2016 | Jin | G06T 3/4053 |
| 9,633,416 | B1* | 4/2017 | Lee | G06T 5/002 |
| 9,767,540 | B2* | 9/2017 | Lin | G06T 5/002 |
| 9,832,351 | B1* | 11/2017 | Schoenblum | H04N 5/21 |
| 2004/0001705 | A1* | 1/2004 | Soupliotis | H04N 5/23248 |
| | | | | 386/242 |
| 2006/0257042 | A1* | 11/2006 | Ofek | G06T 5/005 |
| | | | | 382/255 |
| 2007/0171987 | A1* | 7/2007 | Trimeche | G06T 7/20 |
| | | | | 375/240.27 |
| 2007/0237419 | A1* | 10/2007 | Shechtman | G06K 9/00335 |
| | | | | 382/278 |
| 2008/0316364 | A1* | 12/2008 | Au | H04N 5/21 |
| | | | | 348/608 |
| 2009/0033622 | A1* | 2/2009 | Kalpaxis | G06Q 30/06 |
| | | | | 345/158 |
| 2009/0278961 | A1* | 11/2009 | Mohanty | G06T 5/50 |
| | | | | 348/241 |
| 2010/0034296 | A1* | 2/2010 | Cunha | H04N 19/80 |
| | | | | 375/240.29 |
| 2010/0165206 | A1* | 7/2010 | Nestares | G06T 5/50 |
| | | | | 348/607 |
| 2010/0272311 | A1* | 10/2010 | Nir | G06T 7/269 |
| | | | | 382/100 |
| 2011/0142370 | A1* | 6/2011 | Joshi | G06T 3/4038 |
| | | | | 382/307 |
| 2012/0008051 | A1* | 1/2012 | Gaddy | H04N 5/14 |
| | | | | 348/699 |
| 2012/0105728 | A1* | 5/2012 | Liu | H04N 5/213 |
| | | | | 348/607 |
| 2013/0071040 | A1* | 3/2013 | Jin | G06T 3/4053 |
| | | | | 382/254 |
| 2013/0071041 | A1* | 3/2013 | Jin | G06T 3/4053 |
| | | | | 382/254 |
| 2013/0121577 | A1* | 5/2013 | Wang | G06T 7/20 |
| | | | | 382/173 |
| 2013/0177253 | A1* | 7/2013 | Batur | H04N 19/80 |
| | | | | 382/236 |
| 2014/0254933 | A1* | 9/2014 | Jin | G06K 9/4642 |
| | | | | 382/173 |
| 2014/0355899 | A1* | 12/2014 | Jin | G06T 5/002 |
| | | | | 382/254 |
| 2015/0063709 | A1* | 3/2015 | Wang | G06T 7/0083 |
| | | | | 382/199 |
| 2015/0063717 | A1* | 3/2015 | Pavani | G06T 5/002 |
| | | | | 382/261 |
| 2015/0262336 | A1 | 9/2015 | Jin et al. | |
| 2015/0332438 | A1* | 11/2015 | Lin | G06T 5/002 |
| | | | | 382/159 |
| 2016/0094783 | A1* | 3/2016 | Watanabe | G03G 15/5016 |
| | | | | 348/77 |
| 2016/0191753 | A1* | 6/2016 | Jin | G06T 3/4053 |
| | | | | 348/607 |
| 2017/0084007 | A1* | 3/2017 | Rakhshanfar | H04N 5/21 |
| 2017/0161565 | A1* | 6/2017 | Garud | G06K 9/00791 |
| 2018/0005354 | A1* | 1/2018 | Lin | G06T 5/002 |

OTHER PUBLICATIONS

"Non-Final Office Action", U.S. Appl. No. 14/205,027, dated Jul. 23, 2015, 5 pages.
"Notice of Allowance", U.S. Appl. No. 14/205,027, dated Dec. 9, 2015, 6 pages.

* cited by examiner

VIDEO DENOISING USING OPTICAL FLOW

RELATED APPLICATION

This application is a continuation of and claims priority to U.S. patent application Ser. No. 14/205,027 filed Mar. 11, 2014 entitled "Video Denoising using Optical Flow", the disclosure of which is incorporated by reference herein in its entirety.

BACKGROUND

Video denoising is a challenging problem that is not readily solved, yet an important problem to remove structured noise from digital videos for video processing. Videos that are captured with low-end imaging devices, such as webcams, low-end camcorders, digital cameras, and cell phones that do not have high quality video imaging capabilities can include significant noise, which degrades the image quality and can make a video difficult to watch.

A digital image, such as the sequential image frames in digital video content, can include noise in the form of electronic noise, such as may be introduced into the image frame by the electronics and/or sensor of a digital video camera that is used to capture the image frames of the video content. Another common cause of image noise is when video is captured in low light conditions. Much like a grainy photograph taken with a conventional camera in a low light environment, noise can appear as random specks in a digital image that has been captured with a digital video camera in a low light environment.

Noise may also be introduced into the image frames of digital video content during image processing, such as when a compression technique is applied. Noise in digital video images reduces image detail and clarity, and is likely most notable when the video is displayed on a larger size monitor, rather than on a smaller display device that may be integrated with a digital camera, mobile phone, or other portable media device.

SUMMARY

This Summary introduces features and concepts of video denoising using optical flow, which is further described below in the Detailed Description and/or shown in the Figures. This Summary should not be considered to describe essential features of the claimed subject matter, nor used to determine or limit the scope of the claimed subject matter.

Video denoising using optical flow is described. In embodiments, image frames of video content are received as a sequence of the image frames, and one or more of the image frames include noise that corrupts the video content, such as structured noise that is temporally independent across the image frames. One of the image frames in the sequence is selected as a reference frame, and matching patches can be determined that match an image patch in the reference frame. The matching patches are determined from within a local neighborhood around the image patch in the reference frame based on a k-nearest neighbor search for the matching patches.

A noise estimate is computed for previous image frames and for subsequent image frames relative to the reference frame in the sequence of the image frames. The noise estimate for a particular image frame is computed based on optical flow, and the noise estimate is usable to determine a contribution of similar motion patches in the particular image frame for denoising the image patch in the reference frame. The computed noise estimate for each of the previous and subsequent image frames includes computing an absolute value of pixel-wise differences between the reference frame and the previous and subsequent image frames based on the optical flow computations, and a median noise level of the reference frame is determined based on a median of the absolute values.

One or more of the previous and subsequent image frames can be warped based on the optical flow computations to orient the similar motion patches relative to the image patch of the reference frame for pixel-wise patch comparisons of the similar motion patches to the image patch. Additionally, a number of the image frames in the sequence of the image frames can be adaptively selected as a temporal window of previous and subsequent image frames relative to the reference frame for denoising the image patch in the reference frame. The number of the image frames in the temporal window is selected based on the computed noise estimate for each of the previous and subsequent image frames.

Similar motion patches from the previous and subsequent image frames that correspond to the image patch in the reference frame can then be determined based on the optical flow computations. A distance is computed between the image patch in the reference frame and each similar motion patch in the previous and subsequent image frames. A threshold value is compared to the distance between the image patch in the reference frame and a similar motion patch in one of the image frames, where the distance is compared to the threshold value to determine the similar motion patches from the previous and subsequent image frames that are used to denoise the image patch in the reference frame. The image patch in the reference frame is then denoised based on an average of the matching patches that are determined from within the reference frame and based on the similar motion patches that are determined from the previous and subsequent image frames, which are used based on the noise estimates that are computed for each of the previous and subsequent image frames.

BRIEF DESCRIPTION OF THE DRAWINGS

Embodiments of video denoising using optical flow are described with reference to the following Figures. The same numbers may be used throughout to reference like features and components that are shown in the Figures.

DETAILED DESCRIPTION

Embodiments of video denoising using optical flow are described as techniques to denoise digital video image frames using a spatial and temporal denoising algorithm. For digital video content that is a sequence of image frames, one or more of the image frames may include noise that corrupts the video content. In the spatial aspect, one of the image frames in the sequence is selected as a reference frame, and matching patches can be determined that match an image patch in the reference frame. The matching patches are determined from within a local neighborhood around the image patch in the reference frame based on a k-nearest neighbor search for the matching patches, and an integral image algorithm can be applied to increase the search speed determining the matching patches.

In the temporal aspect, a noise estimate is computed for previous image frames and for subsequent image frames relative to the reference frame in the sequence of image frames. The noise estimate for a particular image frame is computed based on optical flow, and the noise estimate is usable to determine a contribution of similar motion patches in the particular image frame for denoising the image patch in the reference frame. The optical flow between the reference frame and a previous or subsequent image frame is determined based on the apparent motion of objects between the frames, and a motion field is computed that indicates the direction and magnitude of motion at each location in the reference frame. The computed noise estimate for each of the previous and subsequent image frames can be determined as a median noise level based on the optical flow computations. Any of the previous and/or subsequent image frames in the sequence of image frames can be warped based on the optical flow computations to orient the similar motion patches relative to the image patch of the reference frame for pixel-wise patch comparisons of the similar motion patches to the image patch.

A temporal window of image frames both before and after the reference frame can be adaptively selected based on the computed noise estimates for the previous and subsequent image frames relative to the reference frame. For example, only three previous and three subsequent image frames around the reference frame may be selected as the temporal window if the image frames are generally not too corrupted by noise (e.g., as determined by the computed noise estimates). Alternatively, seven previous and seven subsequent image frames around the reference frame may be selected as the temporal window if the image frames are corrupted by noise. The adaptive frame selection provides a faster algorithm when the computed noise estimates are low because the temporal window includes fewer of the image frames, reducing overall algorithm processing.

Similar motion patches from the previous and subsequent image frames that correspond to the image patch in the reference frame can then be determined based on the optical flow computations. Distances can be computed between image patches in the reference frame and each of the similar motion patches in the previous and subsequent image frames. A threshold value can then be compared to the distances between the image patches in the reference frame and the similar motion patches in the image frames. The distance is compared to the threshold value to determine the similar motion patches from the previous and subsequent image frames that are used to denoise an image patch in the reference frame. The image patch in the reference frame is then denoised based on an average of the matching patches that are determined from within the reference frame and based on the similar motion patches that are determined from the previous and subsequent image frames, which are used based on the noise estimates that are computed for each of the previous and subsequent image frames.

While features and concepts of video denoising using optical flow can be implemented in any number of different devices, systems, networks, environments, and/or configurations, embodiments of video denoising using optical flow are described in the context of the following example devices, systems, and methods.

Figure 1:
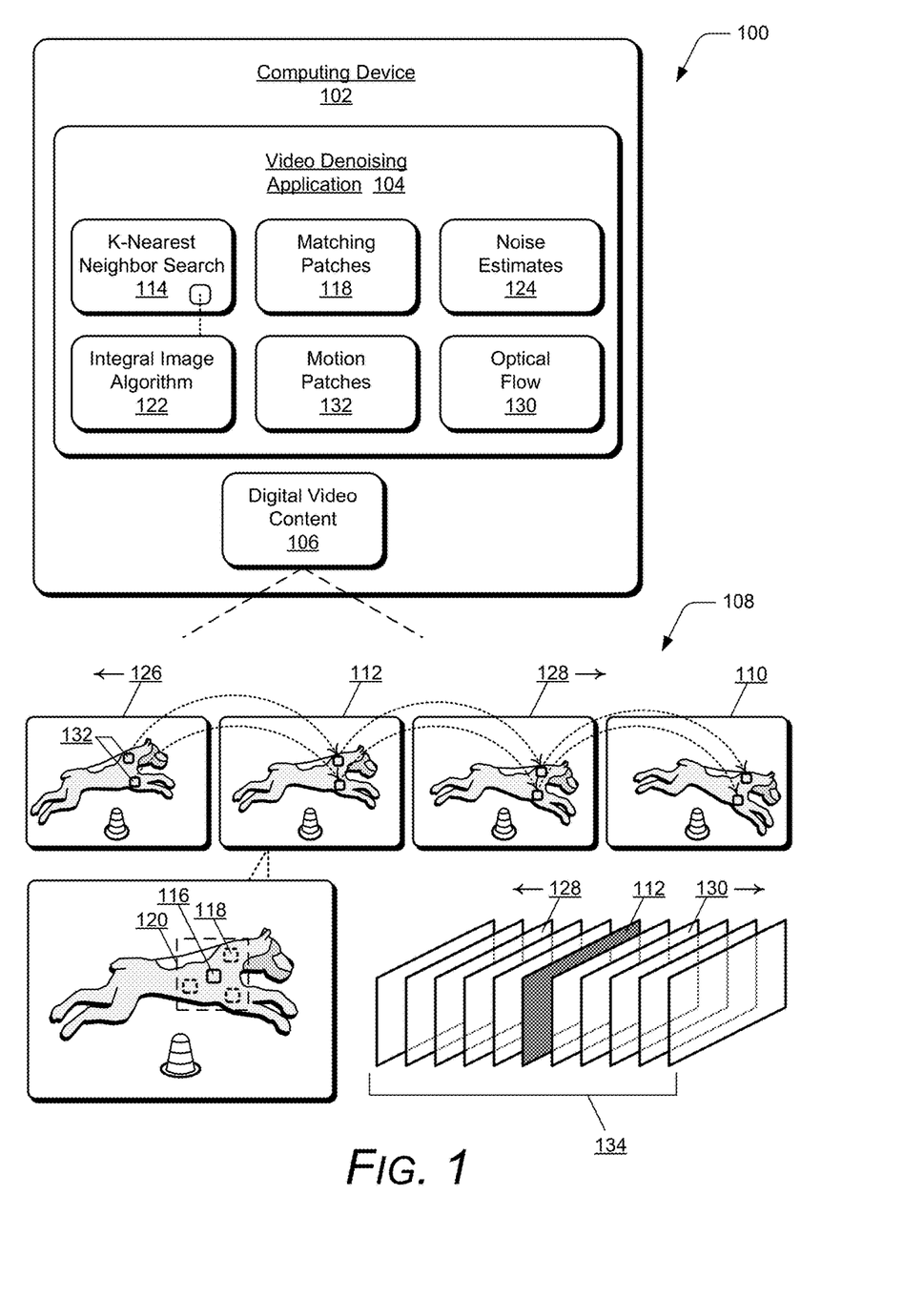
FIG. 1 illustrates an example of a computing device that implements an video denoising application in accordance with one or more embodiments of video denoising using optical flow.

FIG. 1 illustrates an example 100 of a computing device 102 that implements a video denoising application 104 in embodiments of video denoising using optical flow. The example 100 includes digital video content 106 that is a sequence 108 of image frames 110. The digital video content 106 can include any type of digital images as the image frames 110, which can be displayed on a display device of a computing system or device. The digital video content 106 can also be displayed on any type of display device that is connected to, or integrated with, the computing device 102, such as any type of computer, mobile phone, tablet device, digital camera, or any other electronic media device that implements the video denoising application 104 (e.g., a software application) in embodiments of video denoising using optical flow. The image frames 110 of the video content 106 are also referred to herein as input image frames, such as any type of digital image that is an input to the computing device or to a computing system for any type of digital processing.

In implementations, the video denoising application 104 is implemented as a software application, such as executable software instructions (e.g., computer-executable instructions) that are executable by a processing system of the computing device 102 and stored on a computer-readable storage memory of the device. The computing device can be implemented with various components, such as a processing system and memory, and with any number and combination of differing components as further described with reference to the example device shown in FIG. 6.

In embodiments, the video denoising application 104 implements a spatial and temporal denoising algorithm to denoise the digital video content 106, where one or more of the image frames 110 may include noise that corrupts the video content, such as structured noise that is temporally independent across the image frames. For each application of the algorithm, one of the image frames 110 in the sequence 108 is selected as a reference frame 112, and in the spatial aspect, matching patches can be determined that match an image patch in the reference frame. For example, the video denoising application 104 implements a k-nearest neighbor search 114 for an image patch 116 of the reference frame 112 to determine matching patches 118 from within a local neighborhood 120 around the image patch in the reference frame.

In implementations, the local neighborhood 120 may be a region of twenty to thirty pixels, for example. Additionally, the image patches may be considered as each pixel of the current reference frame, or may be a larger region of the frame that includes a grid of multiple pixels. A patch of several pixels will typically have more colors and other visual characteristics that make the patch less ambiguous, and likely easier to match for spatial coherency. For the image patch 116 centered at $x_0$, the matching patches $u(x_0)$ are determined in the small search space u (e.g., the local neighborhood 120):

$$u(x_0) = \min \sum_{x \in \Omega(x_0)} \|I(x) - I(x+u)\|$$

Additionally, an integral image algorithm 122 can be applied to the brute force search that increases the search speed determining the matching patches. The integral image definition is:

$$I(x, y) = \sum_{x' \leq x, y' \leq y} i(x', y')$$

and the block summation can be performed efficiently. An integral table can be generated for each offset (u,v) as follows:

$$I_{(u,v)}(x, y) = \sum_{x' \leq x, y' \leq y} \|i_0(x', y') - i_1(x' + u, y' + v)\|^2$$

and the output for any image patch (e.g., image patch 116) in the current reference frame 112 is a list of the similar, matching patches 118 that are determined from the local neighborhood 120 of the image patch.

The video denoising application 104 is implemented to compute a noise estimate 124 for each of the previous image frames 126 and for each of the subsequent image frames 128 relative to the reference frame 112 in the sequence 108 of the image frames. The noise estimate 124 for a particular previous or subsequent image frame can be computed based on optical flow 130, and the noise estimate is usable to determine a contribution of similar motion patches 132 in the particular image frame for denoising the image patch 116 in the reference frame 112. An example of the optical flow 130 that is computed between the reference frame 112 and another image frame in the sequence 108 of the image frames 110 is described and shown with reference to FIG. 2.

Figure 2:
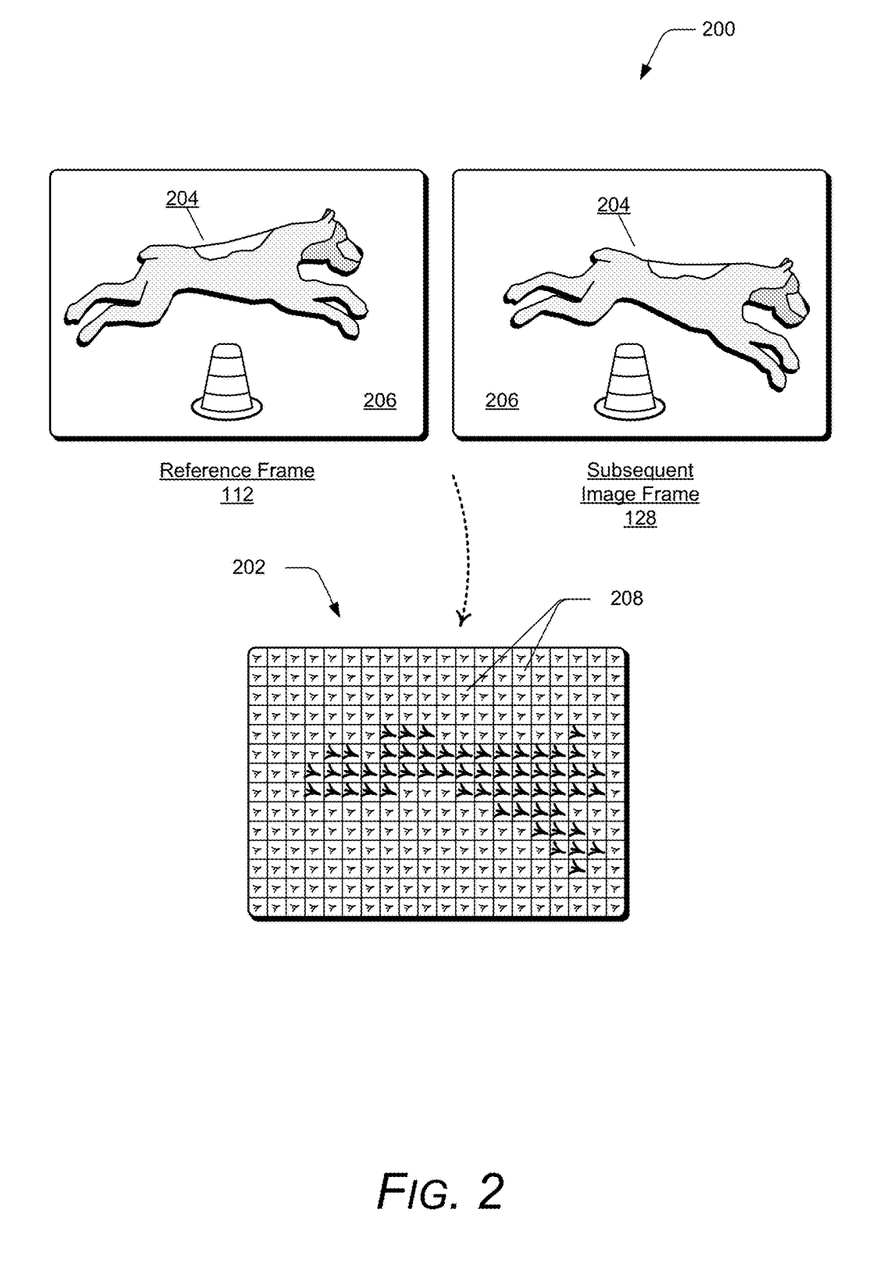
FIG. 2 illustrates an example of an initial motion field computed by optical flow for image frames of digital video content in accordance with one or more embodiments of video denoising using optical flow.

FIG. 2 illustrates an example 200 of a motion field 202 generated by the optical flow 130 of the video denoising application 104 based on the apparent motion of objects between the reference frame 112 and a subsequent image frame 128, such as the motion of the dog 204 and the lack of motion of the background 206. Motion data of the apparent motion of the objects between the digital image frames includes vectors that define the motion field. For a point $p_o$ on an object that moves with a velocity $v_o$, then the imaged point $p_i$ can be assigned a vector $v_i$ to indicate its 2D translation movement on a plane of an image. The initial motion field 202 is computed between the reference frame 112 and the subsequent image frame 128, and the direction and magnitude of optical flow at each pixel and/or patch location is represented by the direction and length of arrows 208 in the motion field.

In general, the optical flow 130 infers the apparent motion between the image frames, and computes the motion field 202, such as for optical flow registration, which is useful for tracking object motion in video content, motion segmentation, and other motion processing applications. The motion field 202 that is computed between two image frames indicates the direction and magnitude of optical flow at each location, represented by the direction and length of arrows in the motion field. The noise effect will be different in each of the image frames, and the combined image frame is a smoothed combination of the separate image frames that reduces or eliminates the noise effect of each image frame. Optical flow algorithms also enforce the spatial coherency of pixels and/or patches between images.

Returning to the discussion of the example 100 shown in FIG. 1, the video denoising application 104 is implemented to determine the similar motion patches 132 (e.g., matching patches) from the previous image frames 126 and from the subsequent image frames 128 that correspond to the image patch 116 in the reference frame 112 based on the optical flow computations. For discussion purposes, only two motion patches 132 in each of the image frames 110 in the sequence 108 of image frames is shown, as the motion patches correlate across the image frames. In practice, all of the image patches in the sequence 108 of the image frames 110 can be determined for matching motion patches across the image frames.

The video denoising application 104 is also implemented to compute distances between image patches, such as between the image patch 116 in the reference frame 112 and each similar motion patch 132 in the previous and subsequent image frames. The video denoising application 104 compares a threshold value to the distance between the image patch 116 in the reference frame 112 and a similar motion patch 132 in one of the image frames. The video denoising application compares the distance to the threshold value to determine the similar motion patches 132 from the previous and subsequent image frames that are used to denoise the image patch 116 in the reference frame. In implementations, the threshold value can be greater than the median noise level of the computed noise estimates, and can be established as an integer or a non-integer multiplied times the median noise level, such as 3× or 3.5× the median noise level.

The computed noise estimate 124 for each of the previous image frames 126 and the subsequent image frames 128 includes the video denoising application computing the absolute value of pixel-wise differences between the reference frame 112 and the previous image frames 126 and subsequent image frames 128 based on the optical flow computations. The median noise level of the reference frame 112 can be determined based on a median of the absolute values. The median is used as sigma in the computed noise estimates, which is effective to disregard any noise below the median that may represent occlusion and other outlier noise sources in an image frame.

Additionally, any of the previous and/or subsequent image frames can be warped by the video denoising application 104 based on the optical flow computations to orient the similar motion patches 132 relative to the image patch 116 of the reference frame 112, such as to align, rotate, translate, and/or reposition determined similar motion patches so that they correlate across the image frames. If an area is rotating throughout the video content, then comparing two motion patches pixel-by-pixel between image frames may give a low similarity score unless one of the patches is first rotated to best match the corresponding patch. The patches can then be compared pixel-wise without further transformation in determining nearest neighbors once the previous and subsequent image frames are warped to correlate with the reference frame. The warping effectively provides a way to compare image patches that are under transformations to determine more and better ones of the similar motion patches.

The video denoising application 104 is also implemented to adaptively select a number of the image frames 110 in the sequence 108 of the image frames as a temporal window 134 of previous image frames 126 and subsequent image frames 128 relative to the reference frame 112 for denoising the image patch 116 in the reference frame. The number of the image frames in the temporal window 134 is selected based on the computed noise estimate 124 for each of the previous image frames and the subsequent image frames. For example, only three previous and three subsequent image frames around the reference frame may be selected as the temporal window if the image frames are generally not too corrupted by noise (e.g., as determined by the computed noise estimates). Alternatively, seven previous and seven subsequent image frames around the reference frame may be selected as the temporal window if the image frames are corrupted by noise.

In the example 100, the temporal window 134 is shown as five previous image frames 126 and five subsequent image frames 128 around the reference frame 112. In implementations, the video denoising application 104 can adaptively select the number of the image frames in the temporal window 134, which is fixed for the computations of all the reference frames in the sequence of the image frames. Alternatively, the video denoising application 104 can adaptively select the number of the image frames in the temporal window 134 for each successive reference frame in the sequence of the image frames. The adaptive frame selection provides a faster algorithm when the computed noise estimates are low because the temporal window includes fewer of the image frames, reducing overall algorithm processing.

The video denoising application 104 is implemented to denoise the image patch 116 in the reference frame 112 based on an average of the matching patches 118 that are determined from within the reference frame 112, and based on the similar motion patches 132 that are determined from the previous image frames 126 and from the subsequent image frames 128, which are used based on the noise estimates that are computed for each of the previous and subsequent image frames. The non-local means averaging for an image patch z is calculated as:

$$\hat{I}(z) = \frac{1}{Z} \sum_{i=t-H}^{t+H} \gamma^{|i-t|} \sum_{j=1}^{K} I(z_{ij}) \exp\left\{-\frac{D_w(P(z), P(z_{i,j}))}{2\sigma_t^2}\right\}$$

where Z is the normalization factor:

$$Z = \sum_{i=t-H}^{t+H} \gamma^{|i-t|} \sum_{j=1}^{K} I(z_{ij}) \exp\left\{-\frac{D_w(P(z), P(z_{i,j}))}{2\sigma_t^2}\right\}$$

and γ=0.9 is the time decay. The term for computing the distance between image patches is:

$$D_w(P(z_1), P(z_2)) = \frac{1}{z'} \sum_{u \in [-s,s] \times [-s,s] \times 0} (P(z_1 + u) - P(z_2 + u))^2 \exp\left\{-\frac{\|u\|^2}{2\sigma_p^2}\right\}$$

Example methods 300 and 400 are described with reference to respective FIGS. 3 and 4 in accordance with one or more embodiments of video denoising using optical flow. Generally, any of the services, components, modules, methods, and operations described herein can be implemented using software, firmware, hardware (e.g., fixed logic circuitry), manual processing, or any combination thereof. The example methods may be described in the general context of executable instructions stored on a computer-readable storage memory that is local and/or remote to a computer processing system, and implementations can include software applications, programs, functions, and the like.

Figure 3:
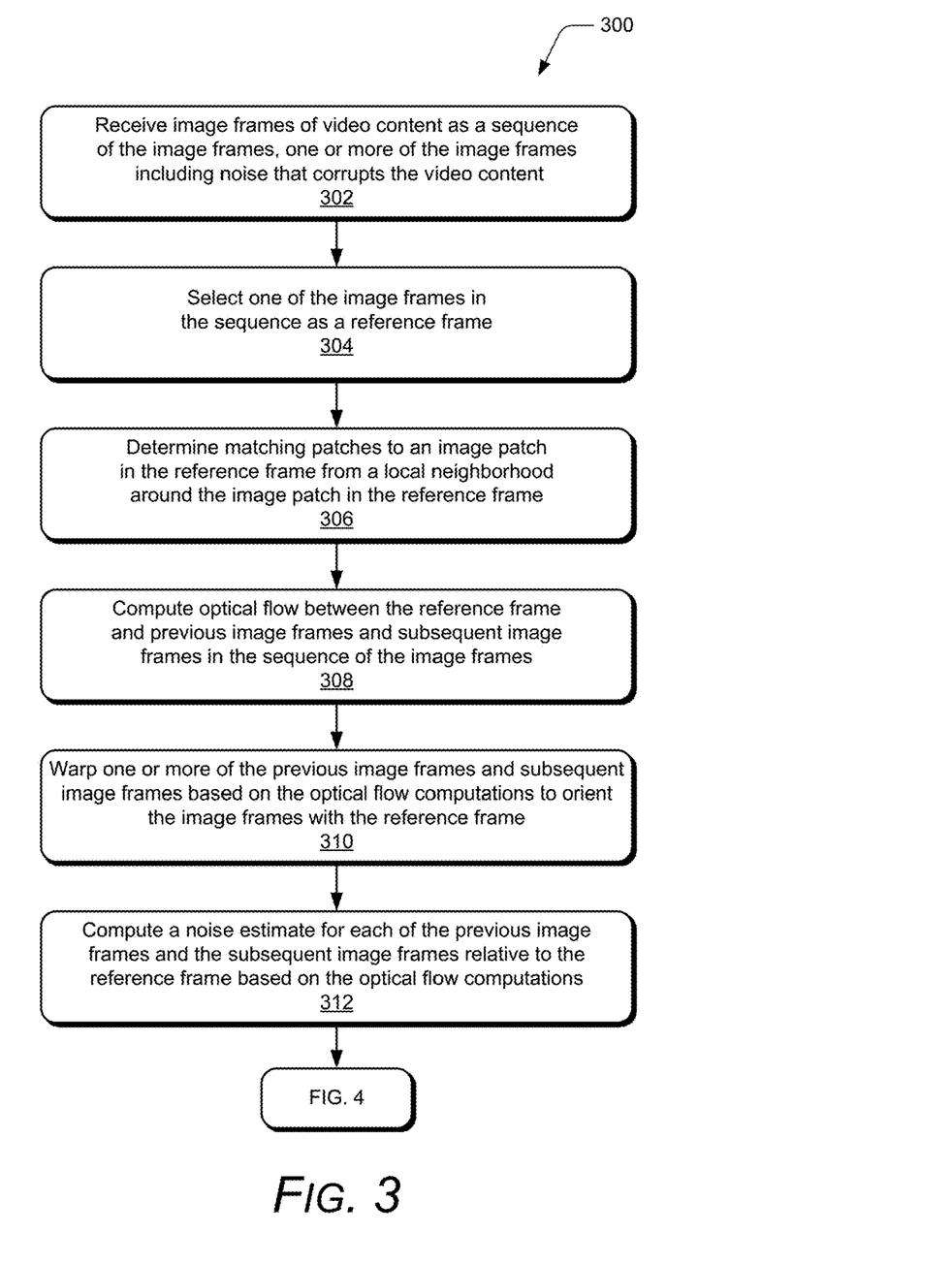
FIG. 3 illustrates example method(s) of video denoising using optical flow in accordance with one or more embodiments.

FIG. 3 illustrates example method(s) 300 of video denoising using optical flow, and is generally described with reference to a video denoising application implemented by a computing device. The order in which the method is described is not intended to be construed as a limitation, and any number or combination of the method operations can be combined in any order to implement a method, or an alternate method.

At 302, image frames of video content are received as a sequence of image frames, where one or more of the image frames include noise that corrupts the video content. For example, the computing device 102 (FIG. 1) receives (or has stored) the digital video content 106 that is the sequence 108 of the image frames 110, and one or more of the image frames 110 may include noise that corrupts the video content, such as structured noise that is temporally independent across the image frames. At 304, one of the image frames in the sequence is selected as a reference frame. For example, the video denoising application 104 that is implemented by the computing device 102 (or implemented at a cloud-based data service as described with reference to FIG. 5) selects one of the image frames 110 in the sequence 108 as the reference frame 112, such as to denoise image patches of the selected reference frame by application of the techniques described herein.

At 306, matching patches to an image patch in the reference frame are determined from a local neighborhood around the image patch in the reference frame. For example, the video denoising application 104 determines the matching patches 118 from within the local neighborhood 120 around the image patch 116 in the reference frame 112. In implementations, the matching patches 118 are determined based on the k-nearest neighbor search 114 for the matching patches of the image patch 116 within the local neighborhood 120 in the reference frame. Additionally, the integral image algorithm 122 is applied to increase the search speed in determining the matching patches.

At 308, optical flow is computed between the reference frame and previous and subsequent image frames in the sequence of the image frames. For example, the video denoising application 104 computes the optical flow 130 between the reference frame 112 and the previous image frames 126 in the sequence 108 of the image frames 110, and computes the optical flow between the reference frame and the subsequent image frames 128 in the sequence of the image frames, such as shown and described with reference to FIG. 2.

At 310, one or more of the previous image frames and subsequent image frames are warped based on the optical flow computations to orient the image frames with the reference frame. For example, the video denoising application 104 warps any of the previous image frames 126 and/or subsequent image frames 128 based on the optical flow computations to orient the similar motion patches 132 relative to the image patch 116 of the reference frame 112, such as to align, rotate, translate, and/or reposition the similar motion patches so that they correlate across the image frames.

At 312, a noise estimate is computed for each of the previous image frames and the subsequent image frames relative to the reference frame based on the optical flow computations. For example, the video denoising application 104 computes the noise estimates 124 for each of the previous image frames 126 and for each of the subsequent image frames 128 relative to the reference frame 112 in the sequence 108 of the image frames based on the optical flow computations. The noise estimate 124 for a particular previous or subsequent image frame is usable to determine a contribution of the similar motion patches 132 in the particular image frame for denoising the image patch 116 in the reference frame 112.

In implementations, the video denoising application 104 computes the noise estimates 124 for each of the previous image frames 126 and the subsequent image frames 128, and includes computing the absolute value of pixel-wise differences between the reference frame 112 and the previous image frames and the subsequent image frames based on the optical flow computations. The median noise level of the reference frame 112 is determined based on a median of the absolute values. The method continues as described with reference to the operations shown in FIG. 4.

Figure 4:
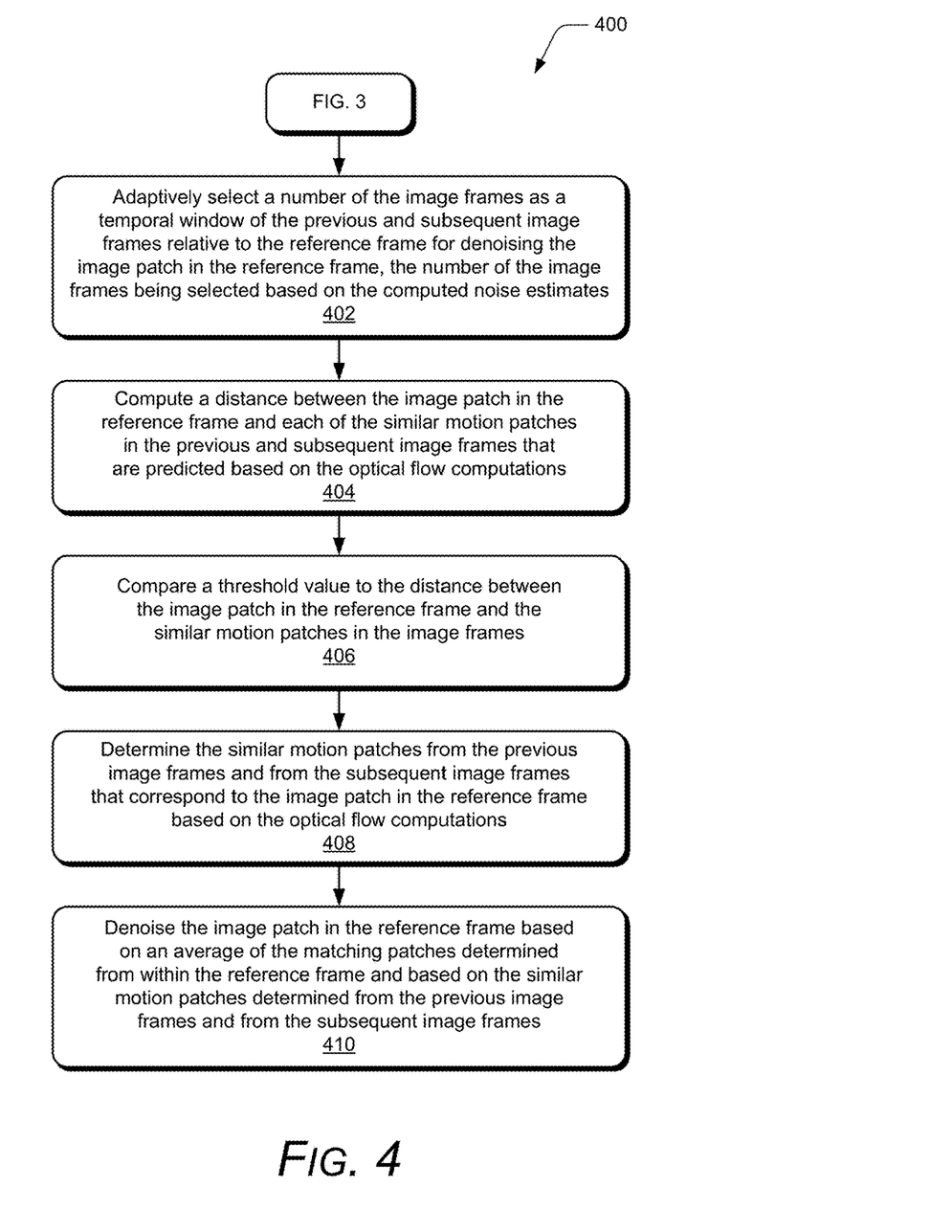
FIG. 4 further illustrates example method(s) of video denoising using optical flow in accordance with one or more embodiments.

FIG. 4 illustrates example method(s) 400 of video denoising using optical flow, and is generally described with reference to a video denoising application implemented by a computing device (as continued from FIG. 3). The order in which the method is described is not intended to be construed as a limitation, and any number or combination of the method operations can be combined in any order to implement a method, or an alternate method.

At 402, a number of the image frames are adaptively selected as a temporal window of the previous and subsequent image frames relative to the reference frame for denoising the image patch in the reference frame, the number of the image frames being selected based on the computed noise estimates. For example, the video denoising application 104 (FIG. 1) adaptively selects a number of the image frames 110 in the sequence 108 of the image frames as the temporal window 134 of the previous image frames 126 and the subsequent image frames 128 relative to the reference frame 112 for denoising the image patch 116 in the reference frame. The number of the image frames in the temporal window 134 is selected based on the computed noise estimates 124 for each of the previous image frames and the subsequent image frames. In implementations, the video denoising application 104 can adaptively select the number of the image frames in the temporal window 134, which is fixed for the computations of all of the successive reference frames in the sequence of the image frames. Alternatively, the video denoising application 104 can adaptively select the number of the image frames in the temporal window 134 for each successive reference frame in the sequence of the image frames.

At 404, a distance is computed between the image patch in the reference frame and each similar motion patch in the previous and subsequent image frames that are predicted based on the optical flow computations. For example, the video denoising application 104 computes distances between image patches, such as between the image patch 116 in the reference frame 112 and each of the similar motion patches 132 in the previous image frames 126 and in the subsequent image frames 128. At 406, a threshold value is compared to the distance between the image patch in the reference frame and the similar motion patches in the image frames. For example, the video denoising application 104 compares a threshold value to the distance between the image patch 116 in the reference frame 112 and the similar motion patches 132 in the previous image frames and the subsequent image frames to determine the similar motion patches 132 from the previous and subsequent image frames that are used to denoise the image patch 116 in the reference frame.

At 408, the similar motion patches from the previous and subsequent image frames that correspond to the image patch in the reference frame are determined based on the optical flow computations. For example, the video denoising application 104 determines the similar motion patches 132 (e.g., matching patches) from the previous image frames 126 and from the subsequent image frames 128 that correspond to the image patch 116 in the reference frame 112 based on the optical flow computations.

At 410, the image patch in the reference frame is denoised based on an average of the matching patches determined from within the reference frame and based on the similar motion patches that are determined from the previous image frames and from the subsequent image frames. For example, the video denoising application 104 denoises the image patch 116 in the reference frame 112 based on an average of the matching patches 118 that are determined from within the reference frame 112 and based on the similar motion patches 132 that are determined from the previous image frames 126 and from the subsequent image frames 128, which are used based on the noise estimates that are computed for each of the previous and subsequent image frames. The method can then continue at 304 (FIG. 3) to repeat the operations for each successively selected reference frame, as well as to denoise each consecutive image patch in the current reference frame.

Figure 5:
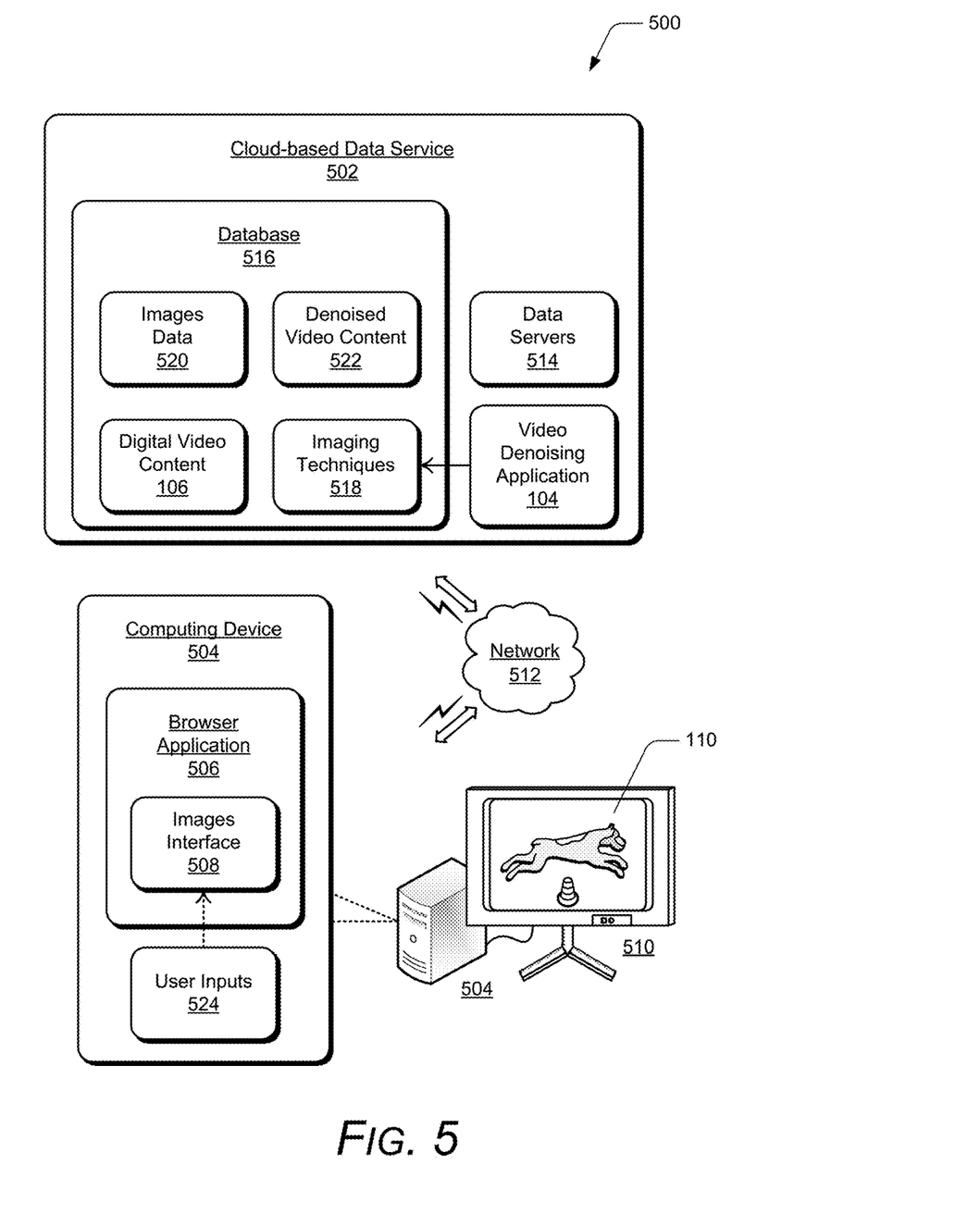
FIG. 5 illustrates an example system in which embodiments of video denoising using optical flow can be implemented.

FIG. 5 illustrates an example system 500 in which embodiments of video denoising using optical flow can be implemented. The example system 500 includes a cloud-based data service 502 that a user can access via a computing device 504, such as any type of computer, mobile phone, tablet device, and/or other type of computing device. The computing device 504 can be implemented with a browser application 506 through which a user can access the data service 502 and initiate a display of an images interface 508 to display images, such as the image frame 110 also shown on a display device 510 that is connected to the computing device. The computing device 504 can be implemented with various components, such as a processing system and memory, and with any number and combination of differing components as further described with reference to the example device shown in FIG. 6.

In embodiments of video denoising using optical flow, the cloud-based data service 502 is an example of a network service that provides an on-line, Web-based version of the video denoising application 104 that a user can log into from the computing device 504 and display the images interface 508. The network service may be utilized for any type of image editing and processing, to include illustration editing, video compositing and editing, graphics and page layouts, animation, and any other type of application user interface. The data service can also maintain and/or upload an input of video image frames (e.g., the digital video content 106) that is displayable in the images interface 508.

Any of the devices, data servers, and networked services described herein can communicate via a network 512, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The cloud-based data service 502 includes data servers 514 that may be implemented as any suitable memory, memory device, or electronic data storage for network-based data storage, and the data servers communicate data to computing devices via the network 512. The data servers 514 maintain a database 516 of the digital video content 106, as well as the imaging techniques 518 that are implemented by the video denoising application 104 as described with reference to FIG. 1. The database 516 can also include the images data 520, such as the image patches 116, matching patches 118, motion patches 132, noise estimates 124, and/or computations of the optical flow 130. The database 516 also includes the denoised video content 522 as the image frames 110 in the sequence 108 of the image frames are consecutively denoised by application of the techniques described herein.

The cloud-based data service 502 includes the video denoising application 104, such as a software application (e.g., executable instructions) that is executable with a processing system to implement embodiments of video denoising using optical flow. The video denoising application 104 can be stored on a computer-readable storage memory, such as any suitable memory, storage device, or electronic data storage implemented by the data servers 514. Further, the data service 502 can include any server devices and applications, and can be implemented with various components, such as a processing system and memory, as well as with any number and combination of differing components as further described with reference to the example device shown in FIG. 6.

The data service 502 communicates the denoised video content 522 and the images interface 508 of the video denoising application 104 to the computing device 504 where the images interface is displayed, such as through the browser application 506 and displayed on the display device 510 of the computing device. The video denoising application 104 can also receive user inputs 524 to the images interface 508, such as when a user at the computing device 504 initiates a user input with a computer input device or as a touch input on a touchscreen to initiate denoising the digital video content 106. The computing device 504 communicates the user inputs 524 to the data service 502 via the network 512, where the video denoising application 104 receives the user inputs.

Figure 6:
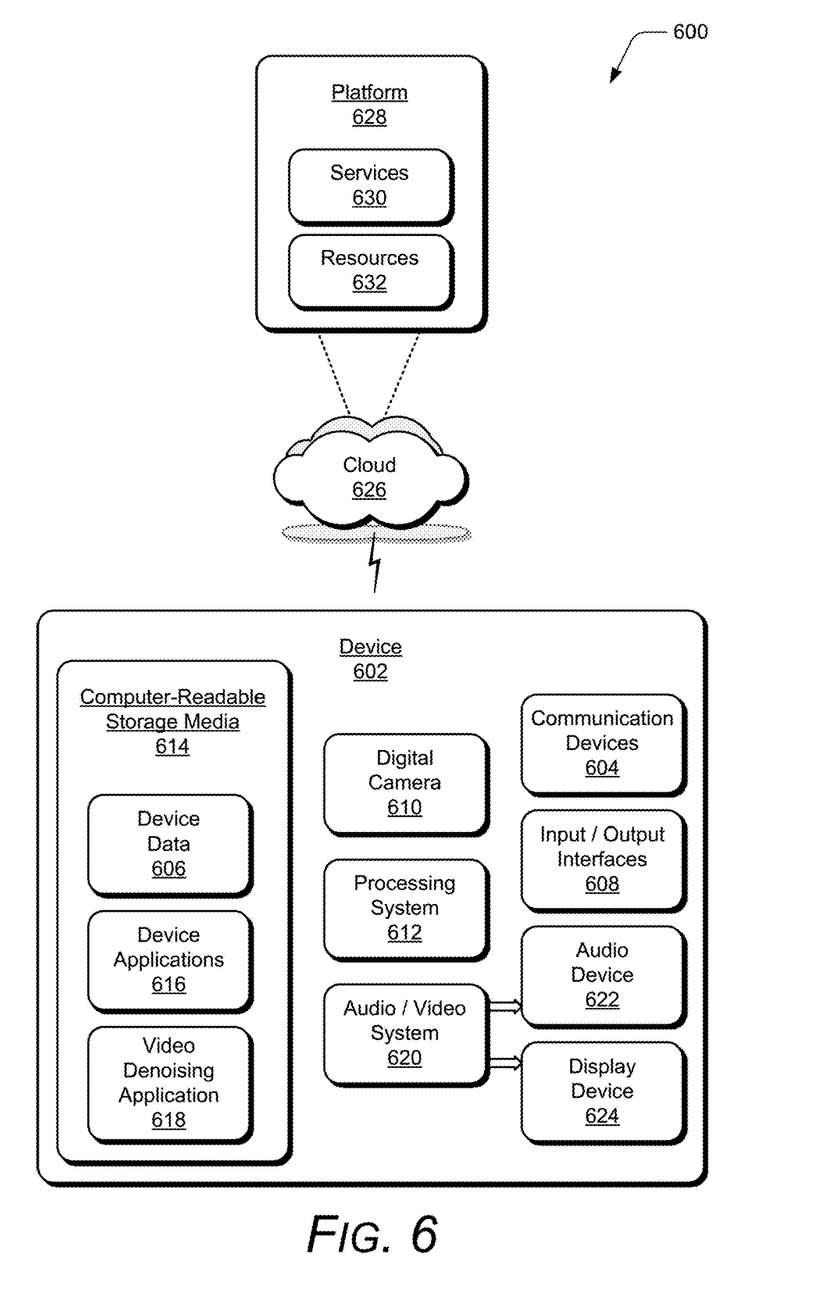
FIG. 6 illustrates an example system with an example device that can implement embodiments of video denoising using optical flow.

FIG. 6 illustrates an example system 600 that includes an example device 602, which can implement embodiments of video denoising using optical flow. The example device 602 can be implemented as any of the devices and/or server devices described with reference to the previous FIGS. 1-5, such as any type of client device, mobile phone, tablet, computing, communication, entertainment, gaming, media playback, digital camera, and/or other type of device. For example, the computing device 102 shown in FIG. 1, as well as the computing device 504 and the data service 502 (and any devices and data servers of the data service) shown in FIG. 5 may be implemented as the example device 602.

The device 602 includes communication devices 604 that enable wired and/or wireless communication of device data 606, such as user images and other associated image data. The device data can include any type of audio, video, and/or image data, as well as the input images. The communication devices 604 can also include transceivers for cellular phone communication and/or for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices, such as a digital camera device 610 and/or display device that may be integrated with the device 602. The I/O interfaces also include data input ports via which any type of data, media content, and/or inputs can be received, such as user inputs to the device, as well as any type of audio, video, and/or image data received from any content and/or data source.

The device 602 includes a processing system 612 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes computer-readable storage media 614, such as storage memory and data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 614 provides storage of the device data 606 and various device applications 616, such as an operating system that is maintained as a software application with the computer-readable storage media and executed by the processing system 612. In this example, the device applications also include a video denoising application 618 that implements embodiments of video denoising using optical flow, such as when the example device 602 is implemented as the computing device 102 shown in FIG. 1, or as the data service 502 shown in FIG. 5. An example of the video denoising application 618 includes the video denoising application 104 implemented by the computing device 102 and/or at the data service 502, as described in the previous FIGS. 1-5.

The device 602 also includes an audio and/or video system 620 that generates audio data for an audio device 622 and/or generates display data for a display device 624. The audio device and/or the display device include any devices that process, display, and/or otherwise render audio, video, display, and/or image data, such as the image content of a digital photo. In implementations, the audio device and/or the display device are integrated components of the example device 602. Alternatively, the audio device and/or the display device are external, peripheral components to the example device.

In embodiments, at least part of the techniques described for video denoising using optical flow may be implemented in a distributed system, such as over a "cloud" 626 in a platform 628. The cloud 626 includes and/or is representative of the platform 628 for services 630 and/or resources 632. For example, the services 630 may include the data service 502 as described with reference to FIG. 5. Additionally, the resources 632 may include the video denoising application 104 and/or the imaging techniques 518 that are implemented at the data service as described with reference to FIG. 5.

The platform 628 abstracts underlying functionality of hardware, such as server devices (e.g., included in the services 630) and/or software resources (e.g., included as the resources 632), and connects the example device 602 with other devices, servers, etc. The resources 632 may also include applications and/or data that can be utilized while computer processing is executed on servers that are remote from the example device 602. Additionally, the services 630 and/or the resources 632 may facilitate subscriber network services, such as over the Internet, a cellular network, or Wi-Fi network. The platform 628 may also serve to abstract and scale resources to service a demand for the resources 632 that are implemented via the platform, such as in an interconnected device embodiment with functionality distributed throughout the system 600. For example, the functionality may be implemented in part at the example device 602 as well as via the platform 628 that abstracts the functionality of the cloud 626.

Although embodiments of video denoising using optical flow have been described in language specific to features and/or methods, the appended claims are not necessarily limited to the specific features or methods described. Rather, the specific features and methods are disclosed as example implementations of video denoising using optical flow.

The invention claimed is:

1. A method, comprising:
    determining matching patches that match an image patch in a reference frame selected from a sequence of image frames;
    computing a noise estimate based on optical flow computations for previous image frames and for subsequent image frames relative to the reference frame in the sequence of the image frames;
    determining, based on the optical flow computations, similar motion patches from the previous and subsequent image frames that correspond to the image patch in the reference frame; and
    denoising the image patch in the reference frame based on the matching patches that are determined from within the reference frame and based on the similar motion patches that are determined from the previous and subsequent image frames.

2. The method as recited in claim 1, further comprising:
    selecting adaptively a number of the image frames in the sequence of the image frames as a temporal window of the previous and subsequent image frames relative to the reference frame for said denoising the image patch in the reference frame, the number of the image frames being selected based on the computed noise estimate for each of the previous and subsequent image frames.

3. The method as recited in claim 2, wherein the method is applied to denoise each consecutive image patch in the reference frame.

4. The method as recited in claim 3, wherein the method is further applied to denoise the video content as each consecutive image frame is selected as the reference frame.

5. The method as recited in claim 1, further comprising:
    computing a distance between the image patch in the reference frame and each similar motion patch in the previous and subsequent image frames that are predicted based on the optical flow computations; and
    comparing a threshold value to the distance between the image patch in the reference frame and a similar motion patch in one of the image frames, the distance compared to the threshold value to said determine the similar motion patches from the previous and subsequent image frames that are used to said denoise the image patch in the reference frame.

6. The method as recited in claim 5, wherein:
    said computing the noise estimate for each of the previous and subsequent image frames is based on a median noise level; and
    the threshold value is established as one of an integer or a non-integer multiplied times the median noise level.

7. The method as recited in claim 1, further comprising:
    warping one or more of the previous and subsequent image frames effective to orient the similar motion patches relative to the image patch of the reference frame for pixel-wise patch comparisons of the similar motion patches to the image patch, the one or more previous and subsequent image frames being warped based on the optical flow computations.

8. The method as recited in claim 1, wherein said determining the matching patches is based on a k-nearest neighbor search for the matching patches of the image patch within the local neighborhood in the reference frame.

9. The method as recited in claim 1, wherein said computing the noise estimate for the previous and subsequent image frames relative to the reference frame includes computing an absolute value of pixel wise differences between the reference frame and the previous and subsequent image frames based on the optical flow computations, and determining a median noise level of the reference frame based on a median of the absolute values.

10. A non-transitory computer-readable storage memory comprising stored instructions that are executable and, responsive to execution of the instructions by a computing device, the computing device performs operations comprising to:
    determine matching patches that match an image patch in a reference frame selected from a sequence of image frames;
    compute a noise estimate based on optical flow computations for previous image frames and for subsequent image frames relative to the reference frame in the sequence of the image frames;
    adaptively select a number of the image frames in the sequence of the image frames as a temporal window of the previous and subsequent image frames relative to the reference frame to denoise the image patch in the reference frame;
    determine, based on the optical flow computations, similar motion patches from the previous and subsequent image frames that correspond to the image patch in the reference frame; and
    denoise the image patch in the reference frame based on the matching patches that are determined from within the reference frame and based on the similar motion patches that are determined from the previous and subsequent image frames in the temporal window.

11. The non-transitory computer-readable storage memory as recited in claim 10, wherein the computing device performs operations further comprising to:
    compute a distance between the image patch in the reference frame and each similar motion patch in the previous and subsequent image frames that are predicted based on the optical flow computations; and compare a threshold value to the distance between the image patch in the reference frame and a similar motion patch in one of the image frames, the distance compared to the threshold value to said determine the similar motion patches from the previous and subsequent image frames that are used to said denoise the image patch in the reference frame.

12. The non-transitory computer-readable storage memory as recited in claim 10, wherein the computing device performs operations further comprising to:

warp one or more of the previous and subsequent image frames effective to orient the similar motion patches relative to the image patch of the reference frame for pixel-wise patch comparisons of the similar motion patches to the image patch, the one or more previous and subsequent image frames being warped based on the optical flow computations.

13. The non-transitory computer-readable storage memory as recited in claim 12, wherein:

the operations are performed to denoise each consecutive image patch in the reference frame; and the operations are further performed to denoise the video content as each consecutive image frame is selected as the reference frame.

14. The non-transitory computer-readable storage memory as recited in claim 10, wherein the operation to determine the matching patches is based on a k-nearest neighbor search for the matching patches of the image patch within the local neighborhood in the reference frame.

15. The non-transitory computer-readable storage memory as recited in claim 10, wherein the operation to compute the noise estimate for the previous and subsequent image frames relative to the reference frame includes operations further comprising to:

compute an absolute value of pixel-wise differences between the reference frame and the previous and subsequent image frames based on the optical flow computations; and determine a median noise level of the reference frame based on a median of the absolute values.

16. A system, comprising:

a memory configured to store image frames of video content as a sequence of the image frames, one or more of the image frames including noise that corrupts the video content;

a processor system to implement a video denoising application that is configured to:

determine matching patches that match an image patch in a reference frame selected from the sequence of the image frames;

select a number of the image frames in the sequence of the image frames as a temporal window of previous image frames and subsequent image frames relative to the reference frame in the sequence of the image frames for denoising the reference frame, the previous and subsequent image frames including similar motion patches to the image patch in the reference frame;

warp one or more of the previous and subsequent image frames effective to orient the similar motion patches relative to the image patch of the reference frame;

compute a noise estimate based on optical flow computations for each of the previous and subsequent image frames relative to the reference frame;

determine, based on the optical flow computations, the similar motion patches from the previous and subsequent image frames that correspond to the image patch in the reference frame; and denoise the image patch in the reference frame based on the matching patches that are determined from within the reference frame and based on the similar motion patches that are determined from the previous and subsequent image frames in the temporal window.

17. The system as recited in claim 16, wherein the video denoising application is configured to:

adaptively select a number of the image frames in the sequence of the image frames as the temporal window of the previous and subsequent image frames relative to the reference frame to denoise the image patch in the reference frame, the number of the image frames being selected based on the computed noise estimate for each of the previous and subsequent image frames.

18. The system as recited in claim 17, wherein operations of the video denoising application are applied to:

denoise each consecutive image patch in the reference frame; and denoise the video content as each consecutive image frame is selected as the reference frame.

19. The system as recited in claim 16, wherein the video denoising application is configured to:

compute a distance between the image patch in the reference frame and each similar motion patch in the previous and subsequent image frames that are predicted based on the optical flow computations; and compare a threshold value to the distance between the image patch in the reference frame and a similar motion patch in one of the image frames, the distance said compared to the threshold value to said determine the similar motion patches from the previous and subsequent image frames that are used to said denoise the image patch in the reference frame.

20. The system as recited in claim 16, wherein the video denoising application is configured to:

said determine the matching patches is based on a k-nearest neighbor search for the matching patches of the image patch within the local neighborhood in the reference frame; and said compute the noise estimate for the previous and subsequent image frames relative to the reference frame by computing an absolute value of pixel wise differences between the reference frame and the previous and subsequent image frames based on the optical flow computations, and determining a median noise level of the reference frame based on a median of the absolute values.

* * * * *